United States Patent
Thompson, Sr.

[11] Patent Number: 6,119,915
[45] Date of Patent: Sep. 19, 2000

[54] ALIGNMENT FIXTURE FOR SOLDER-WAVE MACHINES

[75] Inventor: Curtis C. Thompson, Sr., Meridian, Id.

[73] Assignee: MCMS, Inc., Nampa, Id.

[21] Appl. No.: 08/852,335

[22] Filed: May 7, 1997

[51] Int. Cl.$^7$ .............................. B23K 3/00; B23K 3/08
[52] U.S. Cl. ........................... 228/37; 228/56.5; 118/429
[58] Field of Search .................................... 228/102, 105, 228/104, 180.1, 180.21, 180.22, 37, 56.5; 118/429, 410, 63; 156/578

[56] References Cited

U.S. PATENT DOCUMENTS

| | | | |
|---|---|---|---|
| 4,030,717 | 6/1977 | Serlovsky | 269/118 |
| 4,467,638 | 8/1984 | Greenstein | 73/64.48 |
| 4,529,116 | 7/1985 | Gutbier | 228/103 |
| 4,632,291 | 12/1986 | Rahn et al. | 228/9 |
| 4,666,077 | 5/1987 | Rahn et al. | 228/37 |
| 4,890,781 | 1/1990 | Johnson et al. | 228/7 |
| 5,388,468 | 2/1995 | Sasson | 73/865.9 |
| 5,538,175 | 7/1996 | Massini, Jr. et al. | 228/102 |
| 5,540,376 | 7/1996 | Asla et al. | 228/37 |
| 5,617,988 | 4/1997 | Willeman | 228/37 |

*Primary Examiner*—Samuel M. Heinrich
*Attorney, Agent, or Firm*—Perkins Coie LLP

[57] ABSTRACT

An alignment fixture for aligning components of a solder-wave machine during manufacturing processes of PCB assemblies and other electronic devices. In one embodiment, an alignment fixture has a calibration member that is adapted to be positioned at least in part over a solder-wave of the solder-wave machine. The calibration member may be positioned at a PCB elevation defined by the elevation at which PCB assemblies move over the solder-wave during processing. The calibration member may be an alignment bar or other device that has a solder indicator to indicate the height of the solder-wave relative to the PCB elevation. Additionally, the solder indicator may indicate the extent of deviations between the height of the solder-wave and the PCB elevation across at least a portion of the solder-wave. The alignment fixture, therefore, not only determines whether the solder-wave will sufficiently cover the back side of the PCB, but it may also determine the locations where the nozzles are misaligned and the extent of any such misalignments.

38 Claims, 4 Drawing Sheets

ALIGNMENT FIXTURE FOR SOLDER-WAVE MACHINES

TECHNICAL FIELD

The present invention generally relates to processing printed circuit board assemblies and other electronic components over a solder-wave machine. More specifically, an embodiment of the invention relates to an alignment fixture for aligning the components of a solder-wave machine.

BACKGROUND OF THE INVENTION

Printed circuit board assemblies are used in computers, communications equipment, televisions and many other product. In a typical printed circuit board assembly, many electrical components are attached to the top and bottom surfaces of a printed circuit board (PCB). Since the electronics manufacturing industry is highly competitive, it is important to maximize the through-put of processing PCB assemblies and to securely attach the electrical components to the PCB.

Manufacturing PCB assemblies involves many processes, one of which is through-hole mounting packaged components and passive components to PCBs. To through-hole mount a component to a PCB, the pins of the component are positioned in sockets in the PCB, and then the PCB assembly is passed over a solder-wave machine that flows a wave of molten solder against the bottom side of the PCB. As the PCB assembly passes over the solder-wave, a portion of the solder connects the through-pins of the component to the sockets of the PCB, while the rest of the solder is blown off of the PCB to electrically isolate the separate pins and sockets.

Conventional solder-wave machines generally have a solder reservoir for holding a pool of molten solder, a nozzle for forming and directing the solder-wave, and a number of slide-plates positioned over the molten solder pool and adjacent to the top of the nozzle to protect the molten solder. A number of nitrogen defusers are generally positioned under the slide-plates to form an inert barrier on top of the molten solder pool that reduces the oxidation of molten solder. The slide-plates may be adjusted in two dimensions to vary the size of the opening for the nozzle, and the nozzle may be adjustable in three dimensions to vary the height and orientation of the nozzles to form the solder-wave at a desired height and location. Most solder-wave machines also have an air-knife positioned downstream from the nozzle to blow excess solder off of the PCB assembly and thus electrically isolate the soldered contacts from one another. The slide-plates, nozzle and air-knife are typically arranged along a conveyor path that is inclined at an angle of approximately 6° to enhance the flow of solder off of the back side of the PCB assembly. It will be appreciated that the nozzle may be a chip-wave nozzle to form a turbulent wave or a contour-wave nozzle to form a smooth, laminar-wave. Additionally, the solder-wave machine may have both a chip-wave nozzle and a contour-wave nozzle aligned along the conveyor path to perform both functions in a single solder-wave machine.

In typical PCB assembly manufacturing lines, molten solder may splatter over the slide-plates and an oxidized layer of solder ("dross") may form on top of the molten solder pool. The layer of dross is generally scraped off of the molten solder pool on a daily basis, and the solder-wave machine is generally disassembled and cleaned thoroughly on a weekly basis. For example, to clean a solder-wave machine, the side-plates, nozzles and diffusers are generally removed from the solder reservoir so that dross and other matter may be cleaned from the individual components. Accordingly, the solder-wave machine must be reassembled before additional PCB assemblies can be processed.

Reassembling solder-wave machines, however, is difficult and time-consuming because the nozzles, side-plates and air-knife must be properly aligned to accurately contact the solder-wave with the backside of the PCB assemblies. For example, to cover the backside of the PCB assemblies with molten solder, the nozzles must be accurately positioned with respect to a plane through which the PCB assemblies travel over the solder-wave machine. The nozzles, however, cannot be positioned above the travel plane of the PCB assemblies because the nozzles would then interfere with the PCB assemblies during processing. Additionally, the side-plates must be positioned to cover the solder reservoir without interfering with the drainage of the solder-wave or the PCB assemblies, and the air-knife must be positioned where it can blow off excess solder without interfering with the PCB assemblies. Since the travel plane of the PCB assemblies is generally at a slight angle (e.g., 6°), it is difficult to properly position the nozzles, side-plates and air-knife in proper alignment to perform their functions without interfering with the PCB assemblies.

One conventional process for aligning the components of a solder-wave machine is to use a ruler to measure the desired locations of the nozzles, the side-plates and the air-knife. However, the cleaning and reassembling processes take place while the solder-wave machine is typically very hot (e.g., approximately 480° F.) because it may take over a day to cool the molten solder pool and approximately 8 hours to reheat the molten solder. Additionally, dross is highly toxic so it is undesirable to touch or otherwise spread any dross outside of the solder-wave machine. Therefore, aligning the components of a solder-wave machine with a ruler is very difficult and time-consuming.

Another technique to align the components of a solder-wave machine is to run a glass plate through the solder machine in the travel plane of the PCB assemblies to determine whether the solder-wave contacts; the surface of the glass plate. In this alignment technique, an operator observes the coverage of the solder-wave through the glass plate to see if the solder-wave contacts a sufficient surface area on the bottom side of the glass plate. The glass-plates provide a go/no-go indication of whether the height of the solder-wave is sufficient to cover the PCB assemblies, but they do not indicate the position of any low points along the width of the solder-wave or the distance that such low points deviate from the travel plane of the PCB assemblies. Thus, glass plate techniques simply provide a go/no-go test before processing a run of PCB assemblies.

In light of the difficulties of aligning the components of a solder-wave machine with a ruler or a glass plate, the components of a solder-wave machine are commonly aligned by "eye." However, "eye-balling" the alignment of the components may be inaccurate because it is difficult to align the components of the solder-wave machine along an inclined path. Moreover, the desired minimum clearance between the travel plane of the PCB assemblies and any component of the solder-wave machine is approximately 0.3". Thus, it is difficult to eyeball the precise locations of the components so that they are close enough to operate on the backside of the PCB assemblies without interfering with the PCB travel plane.

SUMMARY OF THE INVENTION

The present invention is an alignment fixture for aligning components of a solder-wave machine. In one embodiment, an alignment fixture has a calibration member that may be positioned, at least in part, over a solder-wave of the solder-wave machine. The calibration member may be positioned at a PCB elevation defined by a travel plane through which the PCB assemblies move over the solder-wave during processing. The calibration member may be an alignment bar or other device that has a solder indicator to indicate the height of the solder-wave relative to the PCB elevation. Additionally, the solder indicator may indicate the position and the extent of deviations between the height of the solder-wave and the PCB elevation across at least a portion of the solder-wave. An embodiment of the alignment fixture, therefore, not only determines whether the solder-wave will sufficiently cover the back side of the PCB, but it may also determine the locations where the components are misaligned and the extent of any such misalignments.

In another embodiment, an alignment fixture or calibration device has a guide structure adapted to be attached to the solder-wave machine and an alignment bar or calibration member movably attached to the guide structure. The guide structure and the alignment bar are configured to hold the alignment bar over the solder-wave when the guide structure is attached to the solder-wave machine. The alignment bar also has a solder indicator to indicate any differences between the height of the solder-wave and the PCB elevation. In this embodiment, the alignment bar is moved along the guide structure across a width-wise dimension of the solder-wave to indicate any deviations between the height of the solder-wave and the PCB elevation at discrete points across the width of the solder-wave. This embodiment of the alignment fixture accordingly indicates the position of low points on the solder-wave and the extent that such low points deviate from the PCB elevation.

The guide structure and alignment bar may have different configurations. In one embodiment, the guide structure is a frame that may be mounted on a conveyor line of a solder-wave machine so that it is suspended over the solder-wave. Additionally, the alignment bar may be attached to the frame so that at least a portion of the alignment bar is positioned over the solder-wave when the frame is mounted to the conveyor line. The alignment bar may also be moveably attached to the frame so that it can move transversely with respect to a conveyor path along which PCB assemblies pass over the solder-wave at the PCB elevation.

In yet another embodiment, the alignment bar also has a clearance gauge spaced apart from the solder indicator by a minimum clearance distance. In this embodiment, the clearance gauge indicates whether the components of the solder-wave machine are positioned too close to the PCB elevation. For example, when the alignment bar is positioned over the solder-wave so that the solder-wave indicator is positioned at the PCB elevation, the clearance gauge may indicate that a component is out of alignment when it engages the component.

DETAILED DESCRIPTION OF THE INVENTION

The present invention relates to an alignment fixture for aligning the components of a solder-wave machine used in PCB assembly manufacturing and the manufacturing of other electrical assemblies. An aspect of one embodiment of the invention is to position an alignment bar over a solder-wave machine at an elevation at which the PCB assemblies pass over the solder-wave during processing. Another aspect of an embodiment of the invention is to provide a solder indicator on the alignment bar that indicates the extent to which the height of the solder-wave deviates from the PCB elevation. Still another aspect of the embodiment of the invention is to provide a clearance gauge spaced apart from the solder indicator by a minimum clearance distance to ensure that the components of the solder-wave machine do not interfere with the travel path of the PCB assemblies. FIGS. 1–4B, in which like reference numbers refer to like parts throughout the various figures, illustrate several embodiments of alignment fixtures and methods in accordance with the invention.

Figure 1A:
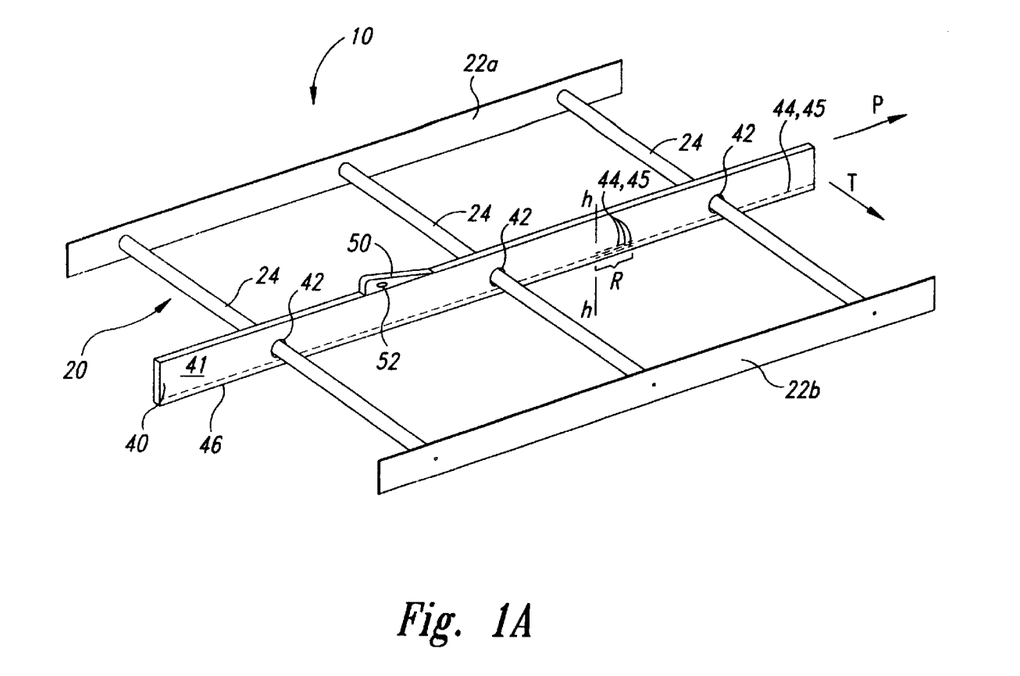
FIG. 1A is an isometric view of an embodiment of an alignment fixture in accordance with the invention.
Figure 1B:
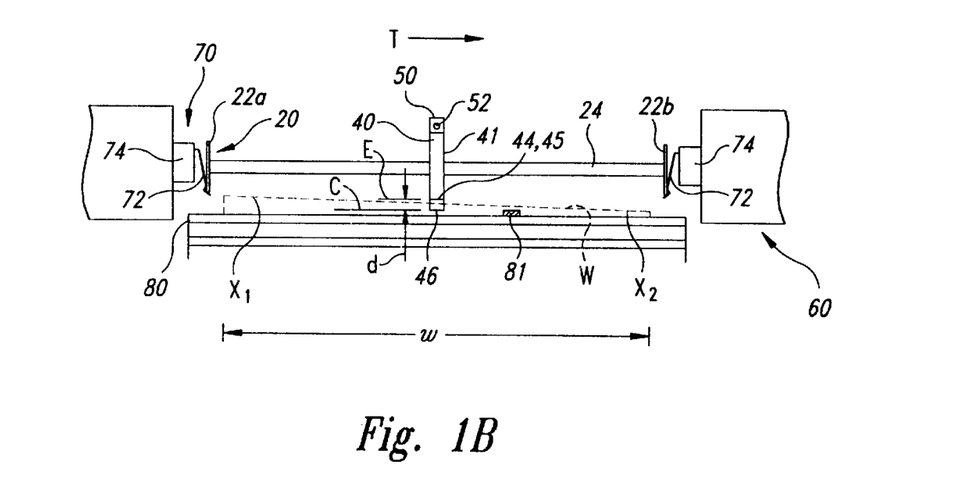
FIG. 1B is a front view of the alignment fixture of FIG. 1A attached to a solder-wave machine.

FIG. 1A is an isometric view of an embodiment of an alignment fixture 10, and FIG. 1B is a schematic front view of the alignment fixture 10 attached to a solder-wave machine 60. The alignment fixture 10 may have a support structure 20 and an alignment bar 40 attached to the support structure 20. The support structure 20 and the alignment bar 40 may have many different configurations to adapt the alignment fixture 10 to different solder-wave machines. Thus, the embodiment of the alignment fixture 10 shown in FIGS. 1A and 1B is only one embodiment of an alignment fixture in accordance with the invention.

The support structure 20 may be a guide structure or frame, and the support structure 20 may be adapted to be attached to a conveyor system 70 (FIG. 1B) or other part of the solder-wave machine 60. In one embodiment, the support structure 20 has a first side-bar 22a, a second side-bar 22b, and a plurality of crossbars 24 extending between the first and second side-bars 22a and 22b. The first and second side-bars 22a and 22b may be carried by one or more pairs fingers of 72 on moveable conveyor tracks 74 of the conveyor system 70 (FIG. 1B). It will be appreciated, however, that the support structure 20 may have other embodiments. For example, the support structure 20 may not have side-bars 22a and 22b such that the cross-bars 24 attach directly to the fingers 72.

The alignment bar 40 may be a calibration member or other type of device that indicates the height of a solder-wave W (FIG. 1B) relative to a PCB elevation E (FIG. 1B) defined by a plane at which the conveyor system 70 carries PCB assemblies (not shown) over the solder-wave machine 60. The alignment bar 40 may have a plurality of holes 42 (FIG. 1A) through which the cross-bars 24 are positioned to allow the alignment bar 40 to move transversely (T) with respect to a conveyor path (P) defined by the direction that the PCB assemblies travel along the solder-wave machine 60. The alignment bar 40 may also have a solder indicator 44 positioned on the alignment bar 40 to be at a predetermined elevation relative to the PCB elevation E when the support structure 20 is mounted to the conveyor system 70. For example, the solder indicator 44 may be positioned at the PCB elevation E (shown in FIGS. 1A and 1B) or at another elevation spaced apart from the PCB elevation E. The solder indicator 44 may be a line extending along the length of a vertical face 41 of the alignment bar 40 (shown in FIG. 1A), or the solder indicator 44 may be a plurality of sensors 45 positioned at discrete points along the length of the alignment bar 40. As described below, the solder indicator 44 indicates the position and the extent that any low points across the solder-wave W deviate from the PCB elevation E.

The solder indicator 44 may also have other embodiments. In one alternative embodiment (shown by region R in FIG. 1A), the solder indicator 44 may be a plurality of individual scales along the alignment bar 40 in which each scale has a plurality of lines or sensors 45 spaced apart from one another along the height axis h—h of the alignment bar 40. In another alternative embodiment in which the solder indicator 44 is a plurality of sensors 45, the sensors 45 may be electrical sensors that work in combination with a terminal 81 in the solder-wave W so that a potential applied to the terminal 81 is sensed by each sensor 45 that contacts the solder-wave W.

FIG. 1B best illustrates the operation of the alignment fixture 10 in which the support structure 20 is mounted to the fingers 72 of the conveyor system 70 to position the alignment bar 40 over a nozzle 80 of the solder-wave machine 60 and the solder-wave W. The alignment bar 40 is then translated along the crossbars 24 in the direction (T) to move the alignment bar 40 through the solder-wave W along at least a portion of the width (w) of the solder-wave W. As the alignment bar 40 translates across the width of the solder-wave W, an operator can observe the height of the solder-wave W relative to the solder indicator 44 at discreet points across the width of the solder-wave W. For example, the height of the solder-wave W at point $X_1$ is at the PCB elevation E, but the height of the solder-wave W at point $X_2$ is below the PCB elevation E. The backside of the printed circuit board assemblies may accordingly be covered with molten solder at point $X_1$ but not at point $X_2$. In addition to identifying the position of point $X_2$ along the width of the solder-wave, the distance between the solder indicator 44 and the solder-wave W at point $X_2$ provides an indication of the extent to which the nozzle 80 is misaligned. Thus, an embodiment of the alignment fixture 10 not only indicates whether the solder-wave W will cover the back side of the PCB with molten solder, but it also indicates the locations and the extent that any low points along the solder-wave W deviate from the PCB elevation E.

The alignment bar 40 may also have a clearance gauge 46 spaced apart from the solder indicator 44 by a clearance distance (d) to ensure that none of the components of the solder-wave machine 60 (e.g., the nozzle 80) will interfere with the PCB assemblies during processing. The clearance gauge 46 may be, for example, the bottom surface of the alignment bar 40, or the clearance gauge 46 may be a tab (not shown) projecting downwardly from the alignment bar 40. As best shown in FIG. 1B, the clearance gauge 46 will engage any component of the solder-wave machine 60 that is positioned above a minimum clearance elevation C as the alignment bar 40 translates across the width of the solder-wave W. For example, the terminal 81 is shown slightly above the minimum clearance elevation C such that the alignment bar 40 will be jarred as it moves across the width of the solder-wave W and hits the terminal 81. Thus, when the clearance gauge 46 contacts a component of the solder-wave machine 60, the alignment bar 40 also indicates that such a component may interfere with the PCB assemblies during processing.

The alignment fixture 10 may also have an incline gauge 50 attached to the frame 20 (not shown) or the alignment bar 40 (best shown in FIG. 1A). The incline gauge 50 may be a level with a bubble indicator 52 that is positioned at an angle with respect to the alignment bar 40. In general, the bubble indicator 52 is positioned at an angle that is equal to the incline of the PCB processing path at which the PCB assemblies pass over the solder-wave. Accordingly, when the bubble indicator 52 is horizontal, the alignment bar 40 is positioned at an angle equal to the incline of the PCB processing path.

Figure 2:
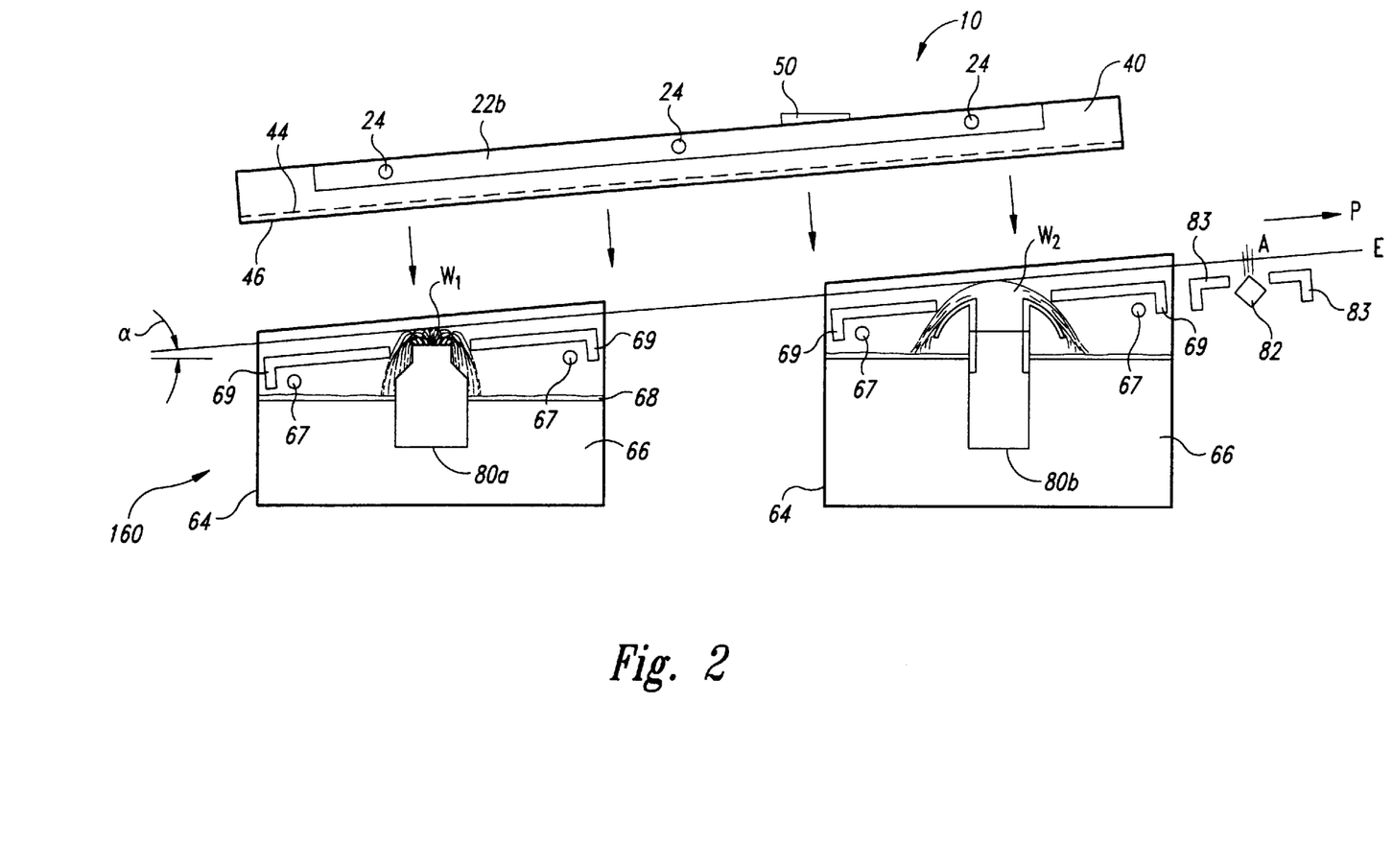
FIG. 2 is an exploded schematic side view of an embodiment of an alignment fixture in accordance with the invention over a solder-wave machine.

FIG. 2 is an exploded schematic side view that illustrates several operational features of an embodiment of the alignment tool 10 in connection with a more complex solder-wave machine 160 that has a chip-wave nozzle 80a to form a first solder-wave $W_1$ and a contour-wave nozzle 80b to form a second solder-wave $W_2$. In a typical solder-wave machine 160, the chip-wave nozzle 80a and the contour-wave nozzle 80b each have a solder reservoir 64 filled with a pool of molten solder 66, a plurality of nitrogen diffusers 67 positioned in the reservoir 64 to dispense a nitrogen barrier 68 over the molten solder pool 66, and a slide-plate 69 positioned on either side of the nozzles 80a and 80b. The solder-wave machine 160 may also have an air-knife 82 with slide-plates 83 downstream from the nozzles 80a and 80b to blow excess solder off of the PCB assemblies (not shown) with an air-stream A. The nozzles 80a and 80b, the nitrogen diffusers 67, the slide-plates 69 and 83, and the air-knife 82 are generally adjustable so that first solder-wave $W_1$, the second solder-wave $W_2$, and the air-stream A will reach the PCB elevation E.

To accurately and quickly align the components of the solder-wave machine 160, the alignment fixture 10 is attached to the conveyor system (not shown in FIG. 2) of the solder machine 160 so that the solder indicator 44 is positioned at the PCB elevation E and the incline gauge 50 indicates that the alignment fixture 10 is at the desired incline α. As described above with respect to FIGS. 1A and 1B, the alignment bar 40 is then translated across both solder-waves $W_1$ and $W_2$ to determine whether any points across the solder-waves $W_1$ and $W_2$ fail to reach the solder indicator 44. Additionally, when the alignment fixture 10 has a clearance gauge 46, the alignment fixture 10 also indicates whether any of the components of the solder-wave machine 160 will interfere with the PCB assemblies during processing. After the alignment bar 40 is translated across the solder-waves $W_1$ and $W_2$, the locations and the extent of any low points across the solder-waves $W_1$ and $W_2$ may be used to properly align the components of the solder-wave machine 160 for processing PCB assemblies.

An advantage of an embodiment of the alignment fixture 10 is that it provides a quick, accurate indication of the location and the extent of misaligned components in a solder-wave machine. Unlike conventional glass plates that provide only a go/no-go gauge, an embodiment of the alignment fixture 10 provides the location and extent to which the nozzles are out of alignment so that they can be accurately repositioned. Additionally, an embodiment of the alignment fixture 10 also indicates whether any of the solder-wave machine components will interfere with the PCB assemblies during processing. Therefore, an embodiment of the alignment fixture 10 may increase the throughput of processing PCB assemblies because it may reduce the down-time for reassembling the solder-wave machines after they have been cleaned.

Another advantage of an embodiment of the alignment fixture 10 with an incline gauge 50 is that it ensures that both the conveyor system and the other components of the solder-wave machine are properly aligned along the inclined processing path. It will be appreciated that it is very difficult to accurately "eye-ball" or even measure the appropriate position of the solder-wave components along a processing path inclined at a small angle (e.g., 4°–8°). However, an embodiment of the alignment fixture 10 with an incline gauge 50 ensures that all of the components of the solder-wave machine are aligned along an inclined path at a desired angle α.

Figure 3A:
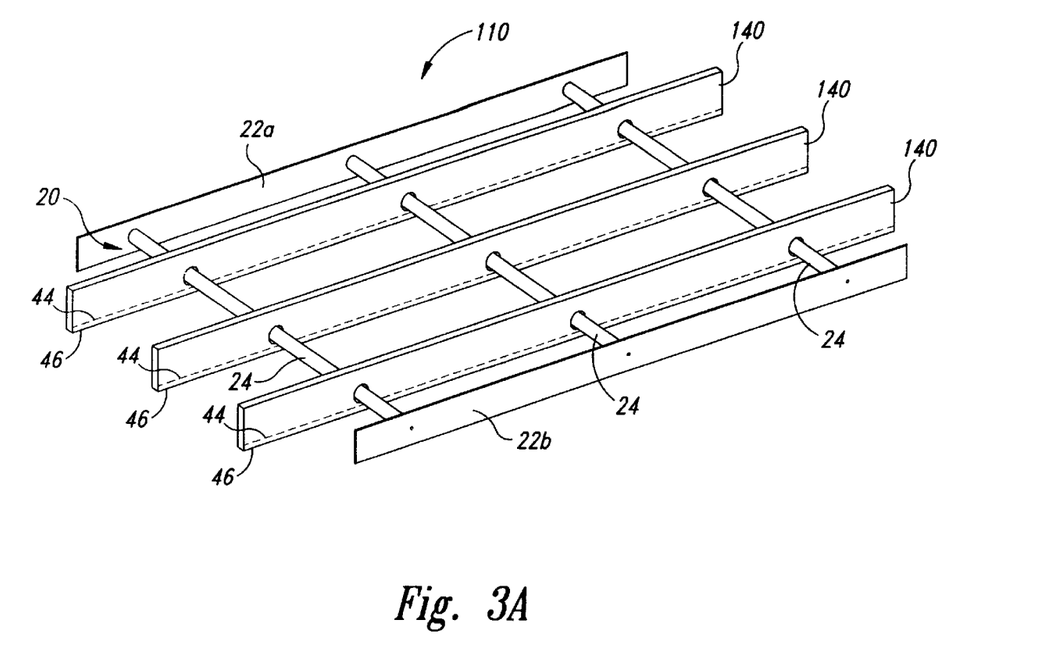
FIG. 3A is an isometric view of another embodiment of an alignment fixture in accordance with the invention.
Figure 3B:
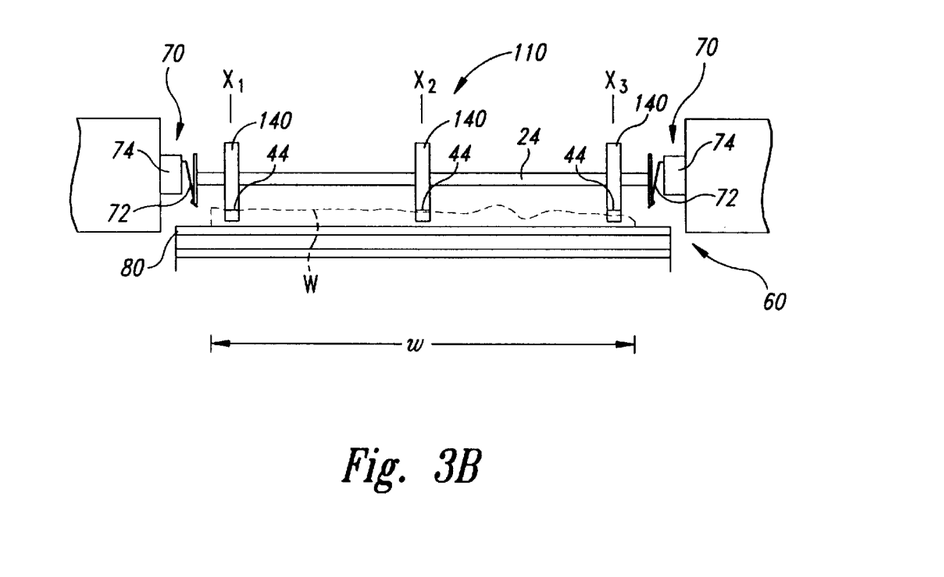
FIG. 3B is a front view of the alignment fixture of FIG. 3A attached to a solder-wave machine.

FIG. 3A is an isometric view of another embodiment of an alignment fixture 110, and FIG. 3B is a front view of the alignment fixture 110 attached to the solder-wave machine 60. As described above with respect to FIGS. 1A and 1B, the alignment fixture 110 has a support structure or frame 20 with cross-bars 24 that extend between side-bars 22a and 22b. Unlike the alignment fixture 10, however, the alignment fixture 110 has a plurality of alignment bars 140 fixedly attached to the cross-bars 24. Each alignment bar 140 generally has a solder indicator 44 and a clearance gauge 46, as described above with respect to the alignment fixture 10.

To align the components of the solder-wave machine with the alignment fixture 110, the side-bars 22a and 22b are mounted to the fingers 72 of the conveyor system 70 (FIG. 3B). The height of the solder-wave W at points $X_1$, $X_2$ and $X_3$ is then observed relative to the solder indicators 44. The alignment fixture 110 accordingly only indicates the alignment of the components of the solder-wave machine 60 at points $X_1$, $X_2$ and $X_3$. In many applications, however, having two or more reference points is sufficient to properly align the components of the solder-wave machine 60. It will be appreciated that the alignment fixture 110 may have any number of alignment bars 140, and that the preferred number of alignment bars 140 will generally be a function of the width of the solder-wave W.

An embodiment of the alignment fixture 110 provides substantially the same advantages as an embodiment of the alignment fixture 10. Compared to the alignment fixture 10, one disadvantage of the alignment fixture 110 is that it does not indicate the alignment of the components across all parts of the solder-wave W. On the other hand, an advantage of the alignment fixture 110 is that the alignment bars 140 do not need to be translated across the cross-bars 24, and thus an operator does not need to reach over the hot molten solder or dross.

Figure 4A:
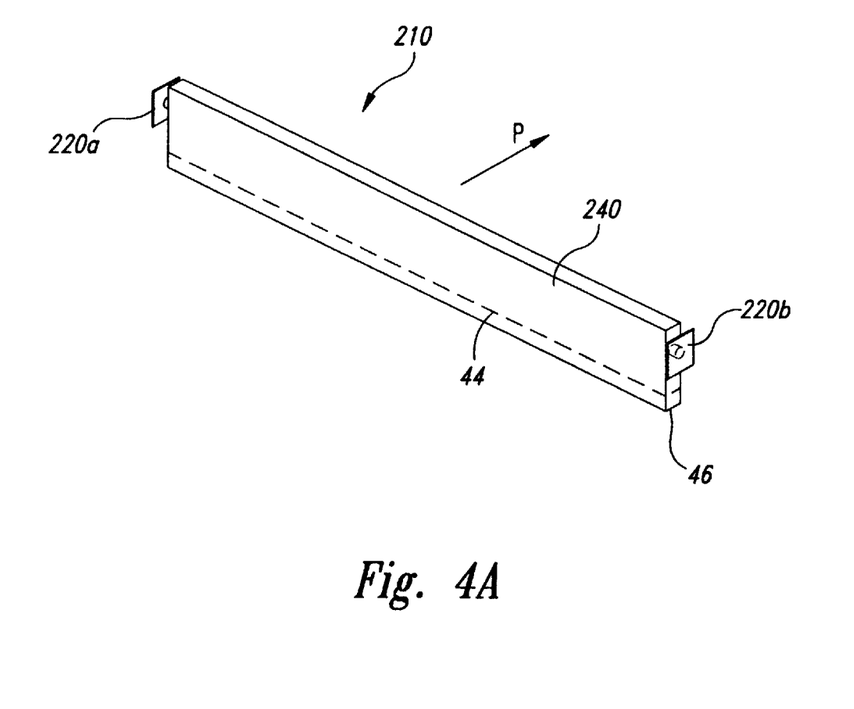
FIG. 4A is an isometric view of another embodiment of an alignment fixture in accordance with the invention.
Figure 4B:
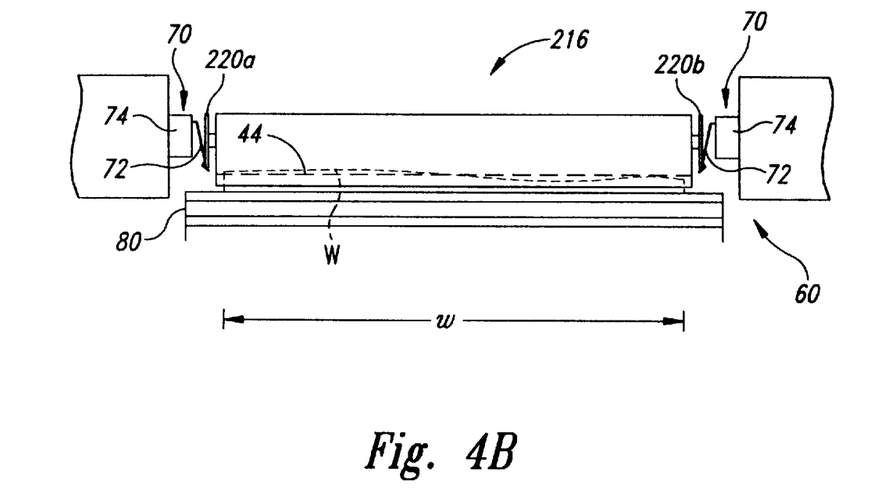
FIG. 4B is a front view of the alignment fixture of FIG. 4A attached to a solder-wave machine.

FIG. 4A is an isometric view of another embodiment of an alignment fixture 210, and FIG. 4B is a front view of the alignment fixture 210 mounted to the solder-wave machine 60. The alignment fixture 210 has an alignment bar 240, a first support structure 220a attached to one end of the alignment bar 240, and a second support structure 220b attached to the other end of the alignment bar 240. As described above with respect to the alignment bars 40 and 140, the alignment bar 240 may also have a solder indicator 44 and a clearance gauge 46. Unlike the previously described alignment bars, however, the alignment bar 240 extends across the widthwise dimension (w) of the solder-wave W between the fingers 72 of the conveyor system 70 (FIG. 4B). In operation, the support members 220a and 220b are mounted to the fingers 72, and then the conveyor tracks 74 move the alignment bar 240 along the conveyor path P (FIG. 4A) until the alignment bar 240 is positioned over the solder-wave W. An operator can then observe the height of the solder-wave W relative to the solder indicator 44 to determine position and extent of any deviations between the height of the solder-wave W and the solder indicator 44.

The advantages of the alignment fixture 210 are substantially the same as those of alignment fixtures 10 and 110. However, when a component is above the minimum clearance height, it is difficult to determine the location of such a component because the clearance indicator spans across the width of the solder-wave W. On the other hand, the alignment fixture 210 illustrates height of the whole width of the solder-wave W at one time so that it is easier to determine the high and low portions of the solder-wave W.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An alignment fixture for aligning components of a solder-wave machine, comprising:

a calibration member adapted to be positioned at least in part over a solder-wave of the solder-wave machine at a predetermined position relative to a printed circuit board elevation at which printed circuit board assemblies move during solder-wave processing, the calibration member having a solder indicator that indicates a height of the solder-wave relative to the printed circuit board elevation and the extent of any differences between the height of the solder-wave and the printed circuit board elevation across at least a portion of the solder-wave: and a support structure adapted to be attached to the solder-wave machine and to hold the calibration member over the solder-wave machine so that the solder indicator is positioned at the printed circuit board elevation, wherein the support structure comprises a frame having side-plates adapted to be carried by a conveyor system of the solder-wave machine and cross-bars extending between the side-plates and the calibration member comprises an alignment bar attached to the cross-bars to extend generally along a processing path along which the printed circuit board assemblies move during processing, and wherein the alignment bar is fixedly attached to the cross-bars.

2. The alignment fixture of claim 1 wherein the calibration member comprises an alignment bar and the solder indicator comprises a primary elevation line on the alignment bar that is located to be at the printed circuit board elevation when the alignment bar is positioned over the solder-wave.

3. The alignment fixture of claim 2 wherein the solder indicator further comprises a plurality of additional lines spaced apart from the primary elevation line along a height axis of the alignment bar.

4. The alignment fixture of claim 1 wherein the solder indicator comprises a plurality of sensors positioned along a primary elevation line on the alignment bar that is located to be at the printed circuit board elevation when the alignment bar is positioned over the solder-wave.

5. The alignment fixture of claim 4 wherein the sensors comprise electrical sensors.

6. The alignment fixture of claim 1 wherein the calibration member comprises an alignment bar with a clearance gauge spaced apart from the solder indicator by a desired clearance distance.

7. The alignment fixture of claim 6 wherein the solder indicator comprises a primary elevation line on the alignment bar that is located to be at the printed circuit board elevation when the alignment bar is positioned over the solder-wave.

8. The alignment fixture of claim 6 wherein the clearance gauge comprises a bottom surface of the alignment bar.

9. The alignment fixture of claim 1 wherein the solder indicator comprises a primary elevation line on the alignment bar that is located to be at the printed circuit board elevation when the side-plates are mounted to the conveyor system.

10. The alignment fixture of claim 1 wherein the solder indicator comprises a plurality of sensors positioned along a primary elevation line on the alignment bar that is located to be at the printed circuit board elevation when the side-plates are mounted to the conveyor system.

11. The alignment fixture of claim 1 wherein a plurality of alignment bars are attached to the cross-bars.

12. An alignment fixture for aligning components of a solder-wave machine, comprising:
   a calibration member adapted to be positioned at least in part over a solder-wave of the solder-wave machine at a predetermined position relative to a printed circuit board elevation at which printed circuit board assemblies move during solder-wave processing, the calibration member having a solder indicator that indicates a height of the solder-wave relative to the printed circuit board elevation and the extent of any differences between the height of the solder-wave and the printed circuit board elevation across at least a portion of the solder-wave: and
   a support structure adapted to be attached to the solder-wave machine and to hold the calibration member over the solder-wave machine so that the solder indicator is positioned at the printed circuit board elevation, wherein the calibration member comprises an alignment bar attached to the support structure to extend generally transverse to a processing path along which the printed circuit board assemblies move during processing.

13. An alignment fixture for aligning components of a solder-wave machine, comprising:
   a calibration member adapted to be positioned at least in part over a solder-wave of the solder-wave machine at a predetermined position relative to a printed circuit board elevation at which printed circuit board assemblies move during solder-wave processing, the calibration member having a solder indicator that indicates a height of the solder-wave relative to the printed circuit board elevation and the extent of any differences between the height of the solder-wave and the printed circuit board elevation across at least a portion of the solder-wave: and
   a support structure adapted to be attached to the solder-wave machine and to hold the calibration member over the solder-wave machine so that the solder indicator is positioned at the printed circuit board elevation, wherein the calibration member comprises an alignment bar, and the support structure comprises first and second side-plates adapted to be carried by a conveyor system of the solder-wave machine, the first side-plate being attached to one end of the alignment bar and the second side-plate being attached to the other end of the alignment bar so that the alignment bar is positioned transversely to a processing path along which the printed circuit board assemblies move during processing.

14. A calibration device for aligning components of a solder-wave machine, comprising:
   a guide structure adapted to be attached to the solder-wave machine, the guide structure including side-bars to engage a conveyor and cross-bars extending between the side bars; and
   an alignment bar fixedly attached to one of the side-bars or the cross-bars of the guide structure to be moved over a solder-wave of the solder-wave machine at a predetermined position relative to a printed circuit board elevation defined by an elevation at which printed circuit board assemblies pass over the solder-wave, the alignment bar having a solder indicator to indicate a height of the solder-wave relative to the printed circuit board elevation, wherein the solder indicator indicates the extent to which the height of the solder-wave deviates from the printed circuit board elevation.

15. The calibration device of claim 14 wherein the solder indicator comprises a primary elevation line on the alignment bar that is located to be at the printed circuit board elevation when the guide structure is attached to the solder-wave machine.

16. The calibration device of claim 15 wherein the solder indicator further comprises a plurality of additional lines spaced apart from the primary elevation line along a height axis of the alignment bar.

17. The calibration device of claim 14 wherein the solder indicator comprises a plurality of sensors positioned along a primary elevation line on the alignment bar that is located to be at the printed circuit board elevation when the guide structure is attached to the solder-wave machine.

18. The calibration device of claim 14 wherein:
   the guide structure comprises a frame having side-plates adapted to be carried by a conveyor system of the solder-wave machine and cross-bars extending between the side-plates; and
   the alignment bar is attached to the cross-bars to extend generally along a processing path along which the printed circuit board assemblies move during processing.

19. A calibration device for aligning components of a solder-wave machine, comprising a guide structure and an alignment bar fixedly attached to the guide structure, the guide structure including side-bars and cross-bars extending between the guide bars, and the alignment bar being fixedly attached to one of the side-bars or the cross-bars to be positioned over a solder-wave of the solder-wave machine at a location along a conveyor path along which printed circuit board assemblies pass over the solder-wave, the alignment bar having a lower surface configured to be located at a clearance level over the solder-wave machine when the alignment bar is positioned over the solder-wave, and the alignment bar having a solder indicator located at a predetermined elevation relative to an elevation at which the printed circuit board assemblies are carried over the solder-wave.

20. The calibration device of claim 19 wherein the solder indicator comprises a primary elevation line on the alignment bar that is located to be at the printed circuit board elevation when the guide structure is attached to the solder-wave machine.

21. The calibration device of claim 20 wherein the solder indicator further comprises a plurality of additional lines spaced apart from the primary elevation line along a height axis of the alignment bar.

22. The calibration device of claim 19 wherein the solder indicator comprises a plurality of sensors positioned along a primary elevation line on the alignment bar that is located to be at the printed circuit board elevation when the alignment bar is positioned over the solder-wave machine.

23. The calibration device of claim 19, further comprising a guide structure having a frame with side-plates adapted to be carried by a conveyor system of the solder-wave machine and cross-bars extending between the side-plates, wherein the alignment bar is attached to the cross-bars to extend generally along a processing path along which the printed circuit board assemblies move during processing.

24. An alignment fixture, comprising:

a support structure adapted to be attached to the solder-wave machine so that a portion of the support structure is positioned above a solder-wave of the solder-wave machine, the support structure having side-bars and cross-bars extending between the side-bars;

a calibration member fixedly attached to one of the side-bars or the cross-bars of the support structure, the calibration member being positioned at least in part over the solder-wave at a location along a conveyor path upon which printed circuit board assemblies pass over the solder-wave when the support structure is attached to the solder-wave machine, and the calibration member having a solder indicator configured to be positioned at a predetermined level relative to a level at which the printed circuit board assemblies pass over the solder-wave machine and a clearance gauge spaced apart from the solder indicator by a minimum clearance distance.

25. The alignment fixture of claim 24 wherein the solder indicator comprises a primary elevation line on the calibration member that is located to be at the printed circuit board elevation when the support structure is attached to the solder-wave machine.

26. The alignment fixture of claim 25 wherein the solder indicator further comprises a plurality of additional lines spaced apart from the primary elevation line along a height axis of the calibration member.

27. The alignment fixture of claim 24 wherein the solder indicator comprises a plurality of sensors positioned along a primary elevation line on the calibration member that is located to be at the printed circuit board elevation when the support structure is attached to the solder-wave machine.

28. The alignment fixture of claim 24 wherein the support structure has side-plates adapted to be carried by a conveyor system of the solder-wave machine and cross-bars extending between the side-plates, and wherein the calibration member is attached to the cross-bars to extend generally along a processing path along which the printed circuit board assemblies move during processing.

29. An alignment fixture, comprising:

a frame adapted to be mounted on a conveyor line of a solder-wave machine to be suspended over a solder-wave of the solder-wave machine, the frame including side-bars and cross-bars extending between the side-bars;

an alignment bar fixedly attached to one of the side-bars or the cross-bars of the frame, the alignment bar being positioned at least in part over the solder-wave when the frame is mounted to the conveyor line so that the alignment bar is located in a conveyor path along which printed circuit board assemblies pass over the solder-wave, and the alignment bar having a solder indicator positioned at a predetermined elevation relative to an elevation at which the printed circuit board assemblies pass along the conveyor path, wherein the solder indicator is configured to engage a fraction of the solder-wave across a widthwise dimension of the solder-wave.

30. The alignment fixture of claim 29 wherein the solder indicator comprises a primary elevation line on the alignment bar that is located to be at the printed circuit board elevation when the frame is attached to the solder-wave machine.

31. The alignment fixture of claim 30 wherein the solder indicator further comprises a plurality of additional lines spaced apart from the primary elevation line along a height axis of the alignment bar.

32. The alignment fixture of claim 29 wherein the solder indicator comprises a plurality of sensors positioned along a primary elevation line on the alignment bar that is located to be at the printed circuit board elevation when the frame is attached to the solder-wave machine.

33. The alignment fixture of claim 29 wherein:

the frame has side-plates adapted to be carried by a conveyor system of the solder-wave machine and cross-bars extending between the side-plates; and the alignment bar is attached to the cross-bars to extend generally along a processing path along which the printed circuit board assemblies move during processing.

34. A solder-wave machine, comprising:

a solder reservoir to hold a pool of molten solder;

a nozzle positioned to form a solder-wave of molten solder;

a support structure attached to the solder-wave machine so that a portion of the support structure is positioned above the solder-wave, the support structure having side-bars and cross-bars extending between the side-bars;

a calibration member fixedly attached to one of the side-bars or the cross-bars of the support structure to extend with respect to a conveyor path along which printed circuit board assemblies pass over the solder-wave, the calibration member having a solder indicator positioned at a predetermined elevation relative to an elevation at which the printed circuit board assemblies move along the conveyor path, wherein the solder indicator indicates the extent to which a height of the solder-wave deviates from the elevation of the solder indicator across at least a portion of the solder-wave.

35. The solder-wave machine of claim 34 wherein the solder indicator comprises a primary elevation line on the calibration member that is located to be at the printed circuit board elevation.

36. The solder-wave machine of claim 35 wherein the solder indicator further comprises a plurality of additional lines spaced apart from the primary elevation line along a height axis of the calibration member.

37. The solder-wave machine of claim 34 wherein the solder indicator comprises a plurality of sensors positioned along a primary elevation line on the calibration member that is located to be at the printed circuit board elevation.

38. The solder-wave machine of claim 34 wherein:

the support structure has side-plates adapted to be carried by a conveyor system of the solder-wave machine and cross-bars extending between the side-plates; and the calibration member is attached to the cross-bars to extend generally along a processing path along which the printed circuit board assemblies move during processing.

* * * * *